(12) United States Patent
Breti

(10) Patent No.: US 11,110,377 B1
(45) Date of Patent: Sep. 7, 2021

(54) BUOYANCY APPARATUS AND KIT

(71) Applicant: PRAIRIE FILTER FLOAT LTD., Raymore (CA)

(72) Inventor: James Breti, Raymore (CA)

(73) Assignee: PRAIRIE FILTER FLOAT LTD., Raymore (CA)

(*) Notice: Subject to any disclaimer, the term of this patent is extended or adjusted under 35 U.S.C. 154(b) by 0 days.

(21) Appl. No.: 16/812,921

(22) Filed: Mar. 9, 2020

(51) Int. Cl.
| *B01D 35/05* | (2006.01) |
| *B01D 29/15* | (2006.01) |
| *A01G 25/00* | (2006.01) |
| *C02F 1/00* | (2006.01) |
| *E03B 3/04* | (2006.01) |
| *C02F 103/00* | (2006.01) |

(52) U.S. Cl.
CPC ............ *B01D 35/05* (2013.01); *A01G 25/00* (2013.01); *B01D 29/15* (2013.01); *C02F 1/001* (2013.01); *E03B 3/04* (2013.01); *B01D 2201/0415* (2013.01); *C02F 2103/007* (2013.01)

(58) Field of Classification Search
CPC ........... B01D 35/05; B01D 29/15; E03B 3/04; C02F 2103/007
USPC ........ 210/122, 170.05, 170.09, 242.1, 747.6; 405/127
See application file for complete search history.

(56) References Cited

U.S. PATENT DOCUMENTS

| 930,903 | A | * | 8/1909 | Tucker | ...................... | E03B 3/04 |
| | | | | | | 405/89 |
| 1,579,917 | A | * | 4/1926 | Deming | .............. | F04B 53/1037 |
| | | | | | | 210/242.1 |
| 2,597,728 | A | * | 5/1952 | Hink | .................... | A62C 25/005 |
| | | | | | | 210/242.1 |
| 4,179,379 | A | * | 12/1979 | Mitchell | ................ | B01D 35/05 |
| | | | | | | 210/242.1 |
| 4,647,374 | A | * | 3/1987 | Ziaylek | .................. | B01D 35/05 |
| | | | | | | 210/242.1 |
| 4,973,405 | A | * | 11/1990 | Kozey | .................... | B01D 35/05 |
| | | | | | | 210/242.1 |
| 7,794,589 | B2 | * | 9/2010 | Kozey | .................... | B01D 35/05 |
| | | | | | | 210/122 |
| 7,938,957 | B2 | * | 5/2011 | Bolan | ....................... | E03B 3/04 |
| | | | | | | 210/122 |
| 8,192,622 | B2 | * | 6/2012 | Kozey | ....................... | E03B 3/04 |
| | | | | | | 210/232 |
| 9,279,225 | B1 | * | 3/2016 | Prokupek | ............... | B01D 35/05 |

* cited by examiner

*Primary Examiner* — Christopher Upton
(74) *Attorney, Agent, or Firm* — Dickinson Wright PLLC; Andrew D. Dorisio

(57) ABSTRACT

The present disclosure provides for a buoyancy apparatus that includes a hollow housing integrally formed below a board. The hollow housing supports the board while the buoyancy apparatus is placed in a liquid. The board is a relatively flat and light weight surface that can be easily retrofitted to different housings. The buoyancy apparatus further includes a connector at a first end of the hollow housing for attaching a filter and at least one orifice at a second end for receiving and securing the filter. The kit may also include the filter for preventing at least one impurity from entering the hose.

18 Claims, 6 Drawing Sheets

BUOYANCY APPARATUS AND KIT

FIELD

The present invention provides a buoyancy apparatus and in particular, a buoyancy apparatus for preventing or reducing impurities from entering a hose when placed in a liquid.

BACKGROUND

The intake of a liquids, such as from an open body of water, is used in irrigational and agricultural fields. The irrigation and agricultural fields have had minor advancements in easing the transportation of liquids and filtering of impurities during intake.

Generally, for the intake of the liquid, a floating assembly attached to a filter is used for drawing the liquids and typically includes a float and a filtering component where the float is supported by the filtering component which strains the liquid, and the combined assembly of the float and the filtering component. Additionally, a hose is attached via a connector for suctioning the liquid and the filtered components are strained from another location.

For example, U.S. Pat. No. 7,794,589 to Kocheck Company LLC and filed on Sep. 5, 2008 teaches a floating suction head assembly for use with a hose for drawing fluids into the hose. The assembly includes a float and a strainer rotatably mounted to the float. The strainer has a coupling portion for coupling to a hose. The strainer strains the drawn liquid and the float allows the strainer to remain under the surface of the body of water.

U.S. Pat. No. 2,597,728 to Lester L. Hink and filed on Jul. 5, 1950 discloses a screened and valved inlet for fire hoses and the like, to provide the inlet for use with a float, so that power pumps may be used to drawing clean water from bodies of water.

U.S. Pat. No. 4,973,405 to Gregory P. Kozey and filed on Jun. 1, 1989 discloses a floating suction head assembly for connection with fire hoses and the like and comprise a float that is U-shaped. The body and each arm of the "U" shaped float are of sealed hollow construction and generally cylindrical. An elongated hollow cylindrical strainer is open at one end for connection with the suction end of a firehose or the like and closed at the opposite end.

SUMMARY

The present disclosure provides a buoyancy apparatus for use with a filter during agricultural and irrigational processes. The ease of installation prevents the user from having direct contact with potentially contaminated liquids and from having health and safety hazards. In addition, the apparatus may be light-weight providing stable flotation and targeted filtration of the liquid. The adaptability of the apparatus in the present disclosure provides savings for both cost and time during operation and/or maintenance.

The buoyancy apparatus includes a hollow housing integrally formed with a hollow board wherein one or more properties of the board and/or housing may provide buoyancy for maintaining the board at a surface of the liquid when placed in the liquid. In another aspect, the board may be a relatively flat and light weight surface that can be retrofitted to different filter housings.

The buoyancy apparatus may further include a connector at a first end of the hollow housing for attaching a hose and at least one orifice. The at least one orifice provides suctioning of the liquid and can be located along the hollow housing and/or at a second end of the hollow housing.

According to an aspect, there is provided a buoyancy apparatus. The buoyancy apparatus may have a hollow housing integrally formed with a board and for maintaining the board at the surface of a liquid when placed in the liquid. The buoyancy apparatus may have a connector at a first end of the hollow housing for attaching an attachment of a filter; and may have at least one orifice at a second end of the hollow housing receiving and securing a hose end of the filter. The surface measures within 12-inches of the liquid. The hollow housing may be made of polyethylene.

The filter may prevent at least one impurity from entering a hose. The hollow housing may be reconfigured to accept at least one different filter. The filter may be tubular shape. A cable coupled to a fastener may secure the filter.

The board at the first end may be convex, at the second end may be convex, or at both the first end and the second end may be convex. The board at the first end may be concave, at the second end may be concave, or at both the first end and the second end may be concave. The board may comprise at least one dimension that extends beyond the hollow housing to provide additional buoyancy.

The buoyancy apparatus may undergo positive buoyancy. The positive buoyancy may be provided by at least one of: at least one cavity within the hollow housing, at least one cavity within the board, and at least one cavity within the hollow housing and the board.

The buoyancy apparatus wherein the filter comprises perforation for preventing the at least one impurity from entering the hose.

The hollow housing may comprise a thin poly-foam membrane and the filter may comprise a plastic weave. The hollow housing may comprise a PVC pipe and the filter may comprises at least one plastic wire.

The buoyancy apparatus wherein the hose end of the filter is configured to couple to the hose.

According to another aspect, there is provided a kit that may comprise a hollow housing integrally formed below a board; a filter configured to be received by the hollow housing; a connector at a first end of the hollow housing for attaching an attachment of the filter; and at least one orifice at a second end of the hollow housing receiving and securing a hose end of the filter. The kit may further comprise a cable coupled to a fastener to secure the filter. The kit may further comprise a hose.

According to another aspect, the buoyancy apparatus may include a filter within the hollow housing for preventing at least one impurity from entering the filter housing.

DESCRIPTION OF THE DRAWINGS

While the invention is claimed in the concluding portions hereof, example aspects are provided in the accompanying detailed description which may be best understood in conjunction with the accompanying diagrams where like parts in each of the several diagrams are labeled with like numbers, and where:

DETAILED DESCRIPTION

Figure 1:
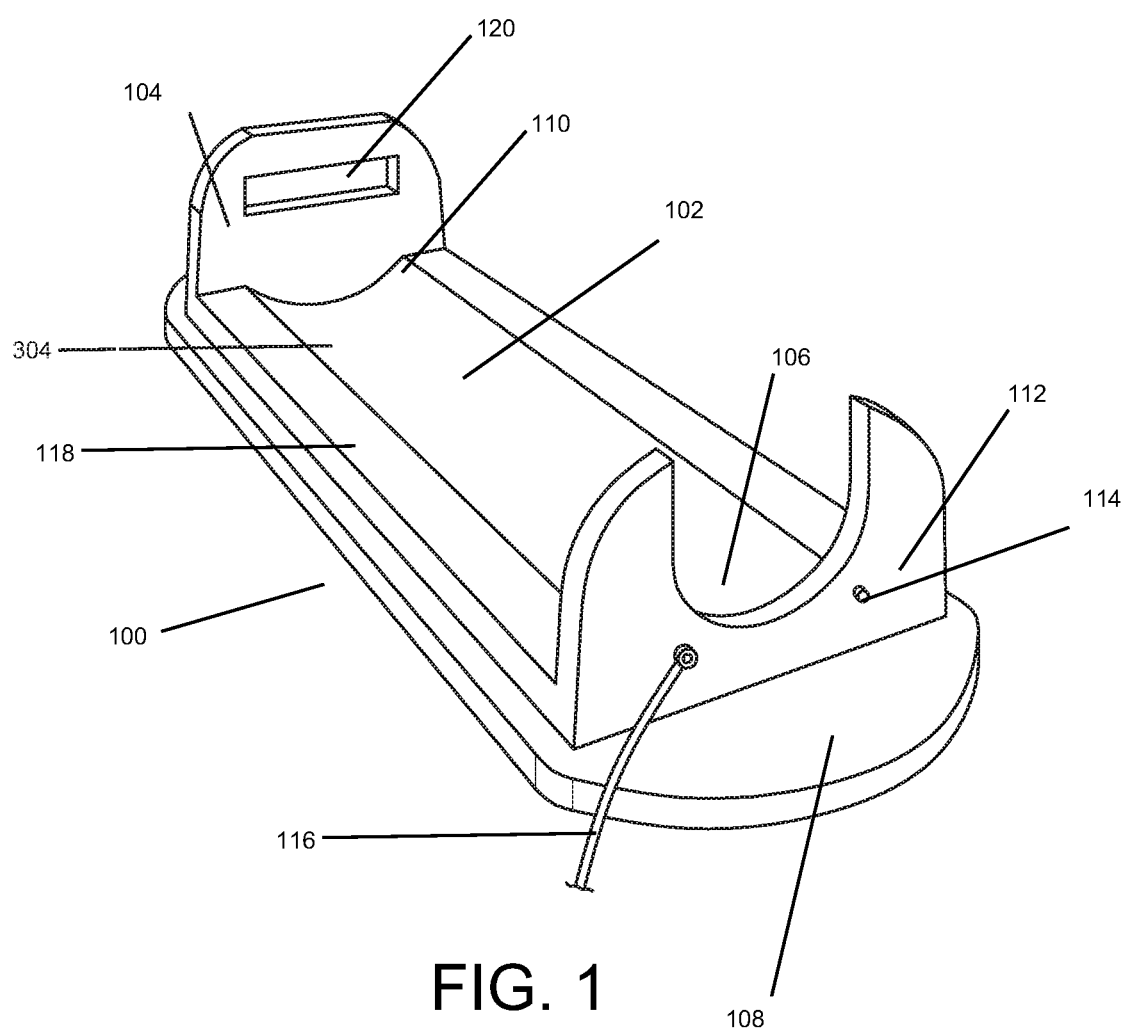
FIG. 1 is a perspective view of a buoyancy apparatus in an inverted position.
Figure 2:
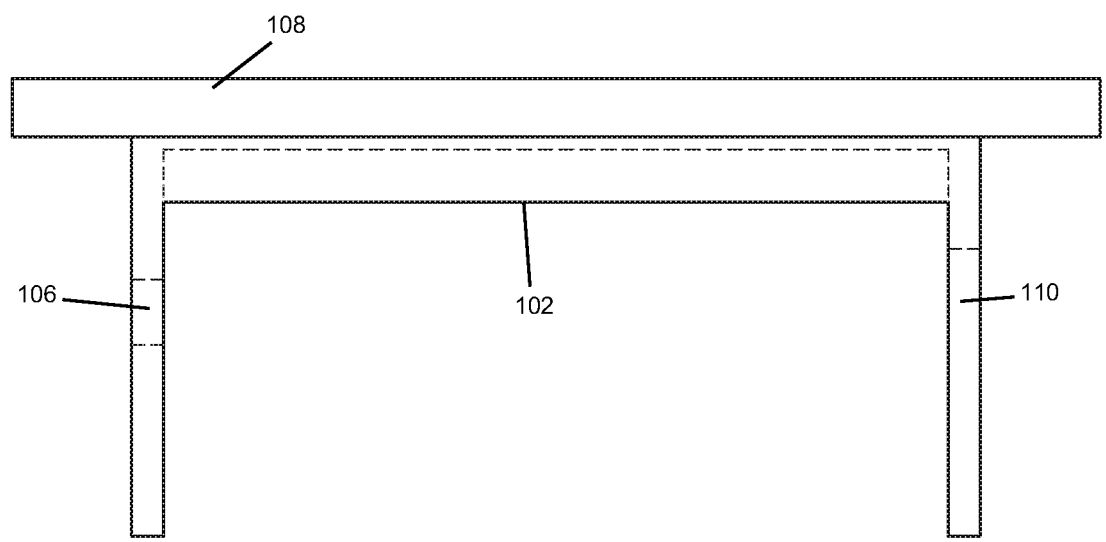
FIG. 2 is a side view of the buoyancy apparatus.

As disclosed in the background, the prior floatable filters include a particular filter and float that are both weighted and rigid. Therefore, if a defect and/or damage occurs to the apparatus, replacing the entire apparatus is likely necessary. Replacing the entire apparatus can be both costly and inefficient, slowing down irrigation and agricultural processes. In addition, different filters may be suitable in different applications.

With reference to FIGS. 1 to 5, a buoyancy apparatus 100 is provided. The buoyancy apparatus 100 may be used for irrigational and agricultural processes and includes a hollow housing 102, a connector or receiver 104, at least one orifice or an arch 106, and a hollow board 108. The buoyancy apparatus 100 may float within about 12-inches of a surface of a liquid, such as water, when placed or immersed in an open body of the liquid such as a lake. Buoyancy may be provided, at least in part, by air trapped within one or more cavities within the hollow housing 102 and/or the hollow board 108. The hollow housing 102 may be a chassis of floatable material such as polyethylene, PVC pipe, or a thin poly-foam membrane.

Figure 5:
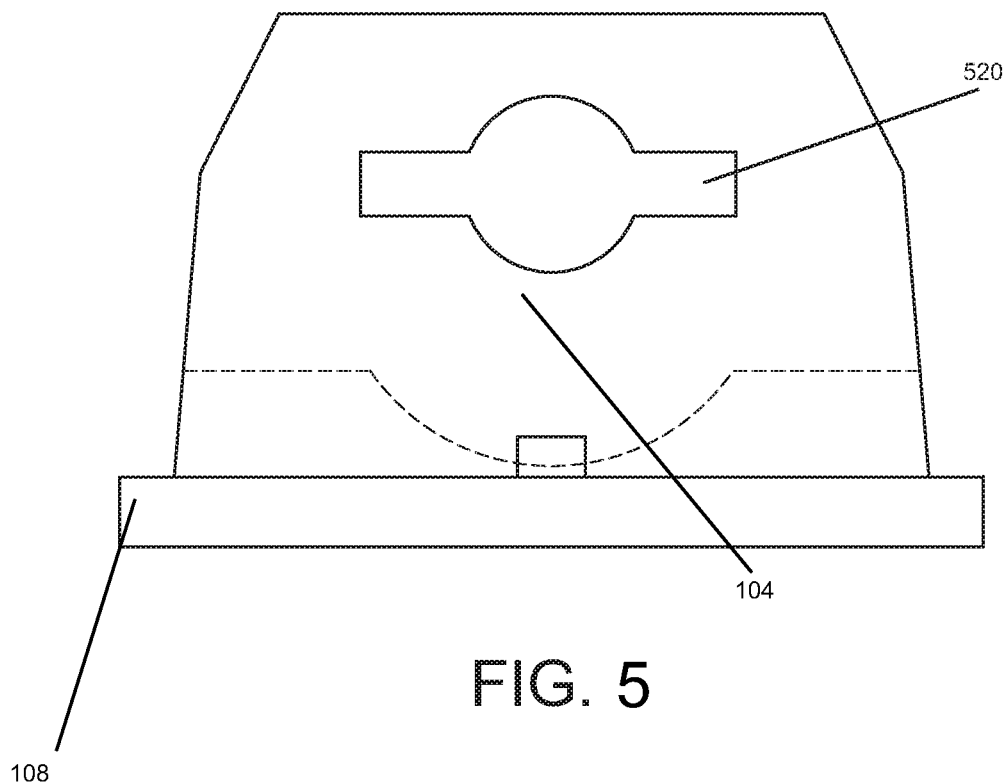
FIG. 5 is a side of the second end of a buoyancy apparatus for suctioning of a liquid.

Fixedly secured to the hollow housing 102 may be the hollow board 108 that may also comprise a floatable material for providing buoyancy and preventing gyration of the buoyancy apparatus 100. Disposed at a first end 110 of the hollow housing 102 may be a connector 104 for attaching to a base attachment 604 of a filter 600, shown particularly in FIG. 6 and described below. The connector 104 may comprise a slot 120 as shown in FIG. 1 or a slotted hole 520 as shown in FIG. 5. The slot 120 and/or slotted hole 520 may have dimensions that correspond to the base attachment 604 of the filter 600 such that the base attachment 604 slides into the slot 120 and/or slotted hole 520. At the second end 112 of the hollow housing 102 may be an arch 106 for receiving a hose attachment end 606 of the filter 600. In this aspect, a curvature of the arch 106 may generally correspond to a curvature of the hose attachment end 606 of the filter 600.

The hollow housing 102 may comprise a curved portion 304 extending between the first end 110 and the second end 112. In this aspect, the curved portion 304 may generally correspond to a curvature of a filter body 602 that may be a larger than the hose attachment end 606 of the filter 600. On either side of the curved portion 304 may be a pair of generally planar portions 118 also extending from the first end 110 to the second end 112.

To install the filter 600 into the buoyancy apparatus 100, the base attachment 604 may be first slid into the slot 120 and/or slotted hole 520 and the hose attachment end 606 may be pivoted into the arch 106. One or more fasteners 114, such as screws, pins, zip ties, clamps or the like, in conjunction with a cable or strap 116 may be used to attach the hose attachment end 606 to the arch 106. In this aspect, the cable 116 may wrap around the hose attachment end 606 of the filter 600 and a loop end 122 of the cable 116 may couple to the fastener 114.

Figure 3:
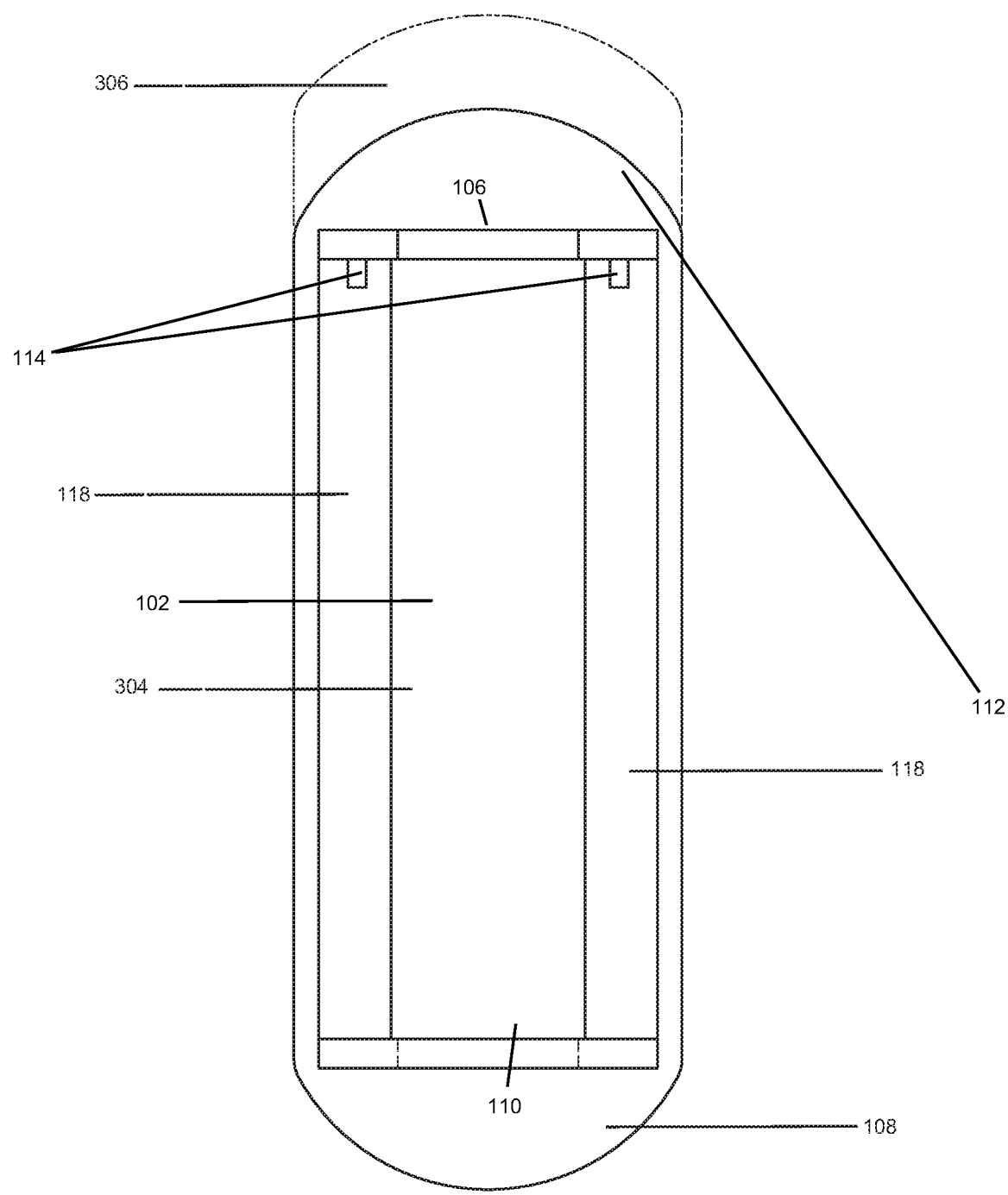
FIG. 3 is a top view of a buoyancy apparatus, particularly illustrating a board.

Shown particularly in FIG. 3, the hollow board 108 may be coupled central to the hollow housing 102 and/or may be integrally formed with the hollow housing 102. In some aspects, a cavity within the hollow board 108 may be operatively connected with a cavity within the hollow housing 102. In other aspects, the cavity within the hollow board 108 may be separate from the cavity within the hollow housing 102. The hollow board 108 may be made of light-weight material and may extend past the hollow housing 102 to allow for buoyancy within 12-inches of the liquid, when immersed. In order to provide additional buoyancy and/or stability, at least one end of the board 108 may be extended and may be curved either inwards (e.g. convex) or outwards (e.g. concave). The additional buoyancy may be provided by extending the cavity to within the extension 306. In some aspects, the board 108 may be resized in order to provide additional buoyancy based, in part, on a mass of the filter 600 and/or the hose coupled thereto.

Figure 4:
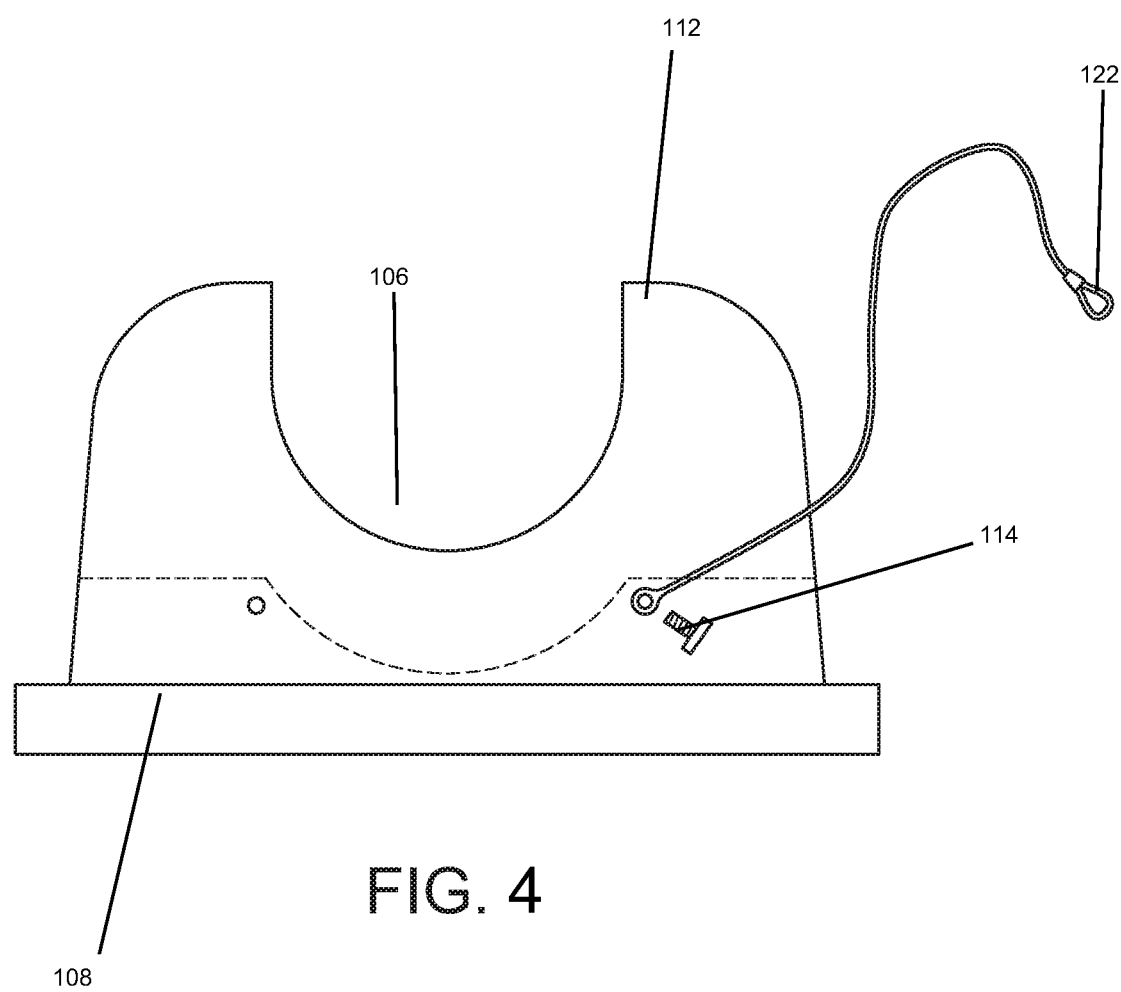
FIG. 4 is a side view of the connector of a buoyancy apparatus for attaching a hose and/or securing a filter to the buoyancy apparatus.

FIG. 4 illustrates the connector 106 at one end of the hollow housing 102, that may comprise a coupler cavity 106, such as the arch, for attaching the hose. FIG. 5 illustrates one example of the orifice 520 at the second end 112 of the hollow housing 102 for securing the base 604 of the filter 600. The orifice 520 may measure various shapes and sizes.

Furthermore, avoiding contact with the liquid may prevent health and safety issues depending on the content of the liquid and impurities in the liquid. For example, an operator using the buoyancy apparatus 100 in a lake may prevent touching hazardous impurities, such as sharp, infectious, caustic, radioactive, and/or poisonous objects during use. Therefore as shown in FIG. 6, the intake of a liquid that is filtered with a filter 600 may be provided between the first end 110 and the second end 112 of the hollow housing 102 to prevent the impurities from entering.

Figure 6:
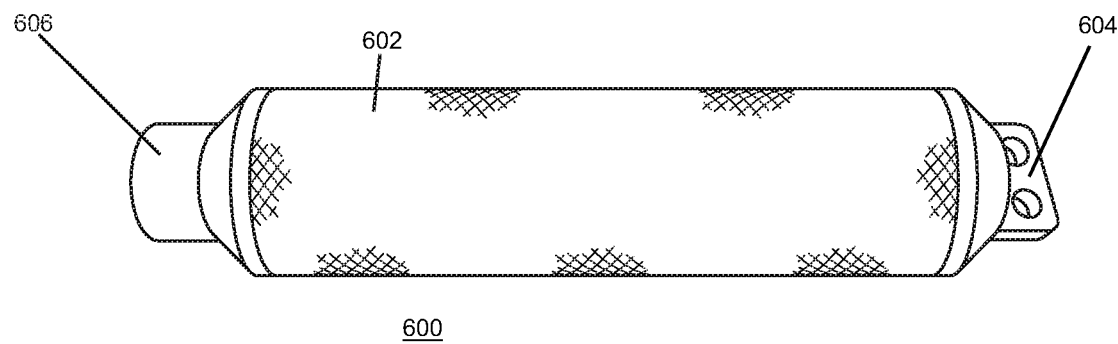
FIG. 6 is a perspective view of a filter.

The filter 600 shown in FIG. 6 is only one example of the filter 600. The filter 600 may take symmetrical shapes such as tubular or rectangular frame, but are not limited to only these shapes and sizes. The hollow housing 102 and the hollow board 108 shapes and sizes may be retrofitted to an operator's filter of choice providing ease in maintenance and/or replacement of the filter 600. The filter 600 may comprise perforations along the body 602 for preventing the at least one impurity from entering the hollow housing 102. Examples of the filters 600 include, but are not limited to a screen 602, a plastic weave, a plastic wire, or the like wrapped around the filter 600, provided the configurations prevent impurities from entering.

According to another aspect, the hollow board 108 may be of varied shapes. The board may be a rectangular, oval, or circular shape. However, the scope of the hollow board is not limited to only these shapes.

According to another aspect, the hollow board 108 may be a separate component from the housing 102. For example, a kit may comprise the hollow board 108, the housing 102, and the filter 600. The housing 102 may be constructed of aluminum, plastic, and/or other metals. The housing 102 may be fastened to the hollow board 108 using fasteners, such as screws, bolts, adhesive, etc.

Although the aspects described herein demonstrate a particular width for a pair of surfaces 118, other aspects may the pair of surfaces 118 having smaller widths, such as to reduce vortexes around the filter 600. In other aspects, a bottom surface of the housing 102 may be flat or, as depicted in FIG. 1, concavely curved in order to receive the filter 600.

According to some aspects, the hollow board 108 and/or the hollow housing 102 may have one or more condensate holes (not shown) for equalizing air pressure within the board 108 and/or housing 102 when changing altitudes as well as one or more plugs to seal the condensate holes.

Although depicted as a slot 120 or a slotted hole 520 in the receiver 104, other aspects may have different shapes dependent on a shape of an attachment 604 of the filter 600.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

I claim:

1. A buoyancy apparatus comprising:
   a hollow housing integrally formed with a buoyant board and for maintaining the board near a surface of a liquid when placed in the liquid;
   a filter;
   a connector at a first end of the hollow housing for attaching an attachment of the filter; and
   at least one orifice at a second end of the hollow housing receiving and securing a hose end of the filter.

2. The buoyancy apparatus of claim 1, wherein the filter prevents at least one impurity from entering a hose.

3. The buoyancy apparatus of claim 2, wherein the filter comprises perforation for preventing the at least one impurity from entering the hose.

4. The buoyancy apparatus of claim 2, wherein the hose end of the filter is configured to couple to the hose.

5. The buoyancy apparatus of claim 1, wherein the buoyant board at the first end is convex, at the second end is convex, or at both the first end and the second end are convex.

6. The buoyancy apparatus of claim 1, wherein the buoyant board comprises at least one dimension that extends beyond the hollow housing to provide additional buoyancy.

7. The buoyancy apparatus of claim 1, wherein the buoyancy apparatus undergoes positive buoyancy.

8. The buoyancy apparatus of claim 7, wherein the positive buoyancy is provided by at least one of: at least one cavity within the hollow housing, at least one cavity within the buoyant board, and at least one cavity within the hollow housing and the buoyant board.

9. The buoyancy apparatus of claim 1, wherein the hollow housing is made of polyethylene.

10. The buoyancy apparatus of claim 1, wherein the board is maintained within 12-inches of the surface of the liquid.

11. The buoyancy apparatus of claim 1 wherein the hollow housing accepts at least one type of the filter.

12. The buoyancy apparatus of claim 1, wherein the filter has a tubular shape.

13. The buoyancy apparatus of claim 1, wherein the hollow housing comprises a thin poly-foam membrane and the filter comprises a plastic weave.

14. The buoyancy apparatus of claim 1, wherein the hollow housing comprises a PVC pipe and the filter comprises at least one plastic wire.

15. The buoyancy apparatus of claim 1, further comprising a cable coupled to a fastener to secure the filter.

16. A kit comprising:
    a hollow housing integrally formed with a buoyant board, the hollow housing providing buoyancy to maintain the board near a surface of a liquid;
    a filter configured to be received by the hollow housing;
    a connector at a first end of the hollow housing for attaching an attachment of the filter; and
    at least one orifice at a second end of the hollow housing receiving and securing a hose end of the filter.

17. The kit of claim 16, further comprising a cable coupled to a fastener to secure the filter.

18. The kit of claim 16, further comprising a hose.

* * * * *